United States Patent
Bivolarsky et al.

(10) Patent No.: US 11,994,494 B2
(45) Date of Patent: May 28, 2024

(54) MULTI-BOUNCE ACOUSTIC SIGNAL MATERIAL DETECTION

(71) Applicant: PERCEPTIVE SENSOR TECHNOLOGIES, INC., Tucson, AZ (US)

(72) Inventors: Lazar Bivolarsky, Cupertino, CA (US);
Joel D. Burcham, Huntsville, AL (US);
Earl Crochet, Humble, TX (US);
James M. Heim, Tucson, AZ (US);
William Coleman, Tucson, AZ (US)

(73) Assignee: PERCEPTIVE SENSOR TECHNOLOGIES, INC., Tucson, AZ (US)

( * ) Notice: Subject to any disclaimer, the term of this patent is extended or adjusted under 35 U.S.C. 154(b) by 0 days.

(21) Appl. No.: 17/542,462

(22) Filed: Dec. 5, 2021

(65) Prior Publication Data
US 2022/0178879 A1    Jun. 9, 2022

Related U.S. Application Data

(60) Provisional application No. 63/121,733, filed on Dec. 4, 2020.

(51) Int. Cl.
*G01N 29/024*     (2006.01)
*G01N 29/028*     (2006.01)
(Continued)

(52) U.S. Cl.
CPC ......... *G01N 29/024* (2013.01); *G01N 29/028* (2013.01); *G01N 29/032* (2013.01);
(Continued)

(58) Field of Classification Search
CPC .. G01N 29/024; G01N 29/032; G01N 29/222; G01N 2291/012; G01N 2291/022;
(Continued)

(56) References Cited

U.S. PATENT DOCUMENTS

| | | | |
|---|---|---|---|
| 2,449,054 A | 9/1948 | Chantlin | 177/311 |
| 3,019,650 A | 2/1962 | Worswick | 73/290 |

(Continued)

FOREIGN PATENT DOCUMENTS

| | | | | |
|---|---|---|---|---|
| CN | 204944617 U | * | 1/2016 | F01K 5/02 |
| CN | 105333925 A | * | 2/2016 | |

(Continued)

OTHER PUBLICATIONS

Amjad, Umar et al, "Advanced signal processing technique for damage detection in steel tubes" Proceedings of SPIE, Health Monitoring of Structural and Biological Systems 2016, 980511 (Apr. 1, 2016); 14 pgs.

(Continued)

*Primary Examiner* — Lisa M Caputo
*Assistant Examiner* — Rose M Miller
(74) *Attorney, Agent, or Firm* — HAYES SOLOWAY P.C.

(57) ABSTRACT

An apparatus and method for multi-bounce acoustic signal material detection is provided. The apparatus includes a container containing a quantity of material therein, wherein the quantity of material has at least two segmented layers. First and second acoustic sensors are positioned on a sidewall of the container, wherein the first acoustic sensor is positioned at a different height along the sidewall than the second acoustic sensor. An acoustic signal is transmitted into the sidewall of the container from the first acoustic sensor. The acoustic signal reflects between an interior surface of the sidewall and an exterior surface of the sidewall until it is received at the second acoustic sensor. A border between the at least two segmented layers of the quantity of material is detectable based on the acoustic signal.

16 Claims, 7 Drawing Sheets

(51) Int. Cl.
  *G01N 29/032* (2006.01)
  *G01N 29/036* (2006.01)
  *G01N 29/22* (2006.01)

(52) U.S. Cl.
  CPC ......... *G01N 29/036* (2013.01); *G01N 29/222* (2013.01); *G01N 2291/012* (2013.01); *G01N 2291/022* (2013.01); *G01N 2291/0222* (2013.01)

(58) Field of Classification Search
  CPC ......... G01N 2291/0222; G01N 29/028; G01N 29/036
  USPC .............................................. 73/592, 290 V
  See application file for complete search history.

(56) References Cited

U.S. PATENT DOCUMENTS

| | | | | |
|---|---|---|---|---|
| 3,703,829 | A | 11/1972 | Dougherty | 73/290 |
| 3,837,218 | A | 9/1974 | Flambard et al. | G01N 29/00 |
| 3,971,962 | A | 7/1976 | Green | H01L 41/08 |
| 4,065,958 | A | 1/1978 | Krylova et al. | G01N 29/02 |
| 4,118,983 | A * | 10/1978 | Brazhnikov | G01F 23/2961 73/290 V |
| 4,121,468 | A | 10/1978 | Glover et al. | G01N 29/04 |
| 4,182,177 | A | 1/1980 | Prough | 73/290 |
| 4,208,908 | A | 6/1980 | Hickox | G01F 1/66 |
| 4,280,126 | A | 7/1981 | White | 340/621 |
| 4,320,659 | A * | 3/1982 | Lynnworth | G01H 15/00 73/290 V |
| 4,326,173 | A * | 4/1982 | Newman | G01F 1/002 331/25 |
| 4,501,146 | A | 2/1985 | Greenhalgh | G01F 23/28 |
| 4,580,448 | A | 4/1986 | Skrgatic | G01F 23/28 |
| 4,596,266 | A | 6/1986 | Kinghorn et al. | B65D 88/38 |
| 4,599,892 | A | 7/1986 | Doshi | G01F 17/00 |
| 4,676,098 | A | 6/1987 | Erlenkämper et al. | 73/290 |
| 4,852,416 | A | 8/1989 | Boone et al. | H04R 1/02 |
| 4,934,191 | A | 6/1990 | Kroening et al. | 73/592 |
| 4,954,997 | A * | 9/1990 | Dieulesaint | G01F 23/2961 367/908 |
| 4,977,780 | A | 12/1990 | Machida et al. | G01N 29/04 |
| 5,015,995 | A | 5/1991 | Holroyd | 340/621 |
| 5,038,611 | A | 8/1991 | Weldon et al. | 73/290 |
| 5,040,415 | A | 8/1991 | Barkhoudarian | G01F 1/66 |
| 5,148,700 | A | 9/1992 | King | G01N 15/00 |
| 5,195,058 | A | 3/1993 | Simon | G01S 15/02 |
| 5,223,822 | A | 6/1993 | Stommes et al. | G08B 7/06 |
| 5,295,120 | A | 3/1994 | McShane | 367/188 |
| 5,325,727 | A | 7/1994 | Miller et al. | G01F 1/34 |
| 5,415,033 | A | 5/1995 | Maresca, Jr. et al. | 73/40.5 |
| 5,438,868 | A | 8/1995 | Holden et al. | 73/290 |
| 5,453,944 | A | 9/1995 | Baumoel | G06F 17/00 |
| 5,460,046 | A | 10/1995 | Maltby et al. | G01N 29/24 |
| 5,469,749 | A | 11/1995 | Shimada et al. | G01F 1/38 |
| 5,604,314 | A | 2/1997 | Grahn | G01L 5/16 |
| 5,663,505 | A | 9/1997 | Nakamura | G01L 9/0022 |
| 5,770,806 | A | 6/1998 | Hiismaki | G01F 1/662 |
| 5,821,427 | A | 10/1998 | Byrd | G01F 1/66 |
| 5,836,192 | A | 11/1998 | Getman et al. | G01F 23/28 |
| 6,035,903 | A | 3/2000 | Few et al. | B65B 1/04 |
| 6,105,431 | A | 8/2000 | Duffill et al. | G01N 29/2487 |
| 6,151,956 | A | 11/2000 | Takahashi et al. | G01N 3/56 |
| 6,157,894 | A | 12/2000 | Hess et al. | 702/54 |
| 6,192,751 | B1 | 2/2001 | Stein et al. | G08B 21/00 |
| 6,330,831 | B1 | 12/2001 | Lynnworth et al. | 73/861.28 |
| 6,354,147 | B1 | 3/2002 | Gysling et al. | G01N 29/00 |
| 6,368,281 | B1 | 4/2002 | Solomon et al. | A61B 8/14 |
| 6,443,006 | B1 | 9/2002 | Degrave | G02F 23/00 |
| 6,470,744 | B1 | 10/2002 | Usui et al. | 73/290 |
| 6,481,287 | B1 | 11/2002 | Ashworth et al. | G01K 11/24 |
| 6,513,385 | B1 | 2/2003 | Han | G01N 29/00 |
| 6,575,043 | B1 * | 6/2003 | Huang | G01F 1/002 73/861.25 |
| 6,578,424 | B1 | 6/2003 | Ziola et al. | G01N 29/00 |
| 6,631,639 | B1 * | 10/2003 | Dam | G01F 23/2961 73/290 V |
| 6,672,163 | B2 | 1/2004 | Han et al. | G01V 1/28 |
| 6,691,582 | B1 | 2/2004 | Nawa et al. | G01F 1/66 |
| 6,836,734 | B2 | 12/2004 | Rojas et al. | G06F 19/00 |
| 6,925,868 | B2 | 8/2005 | Young et al. | 73/290 |
| 6,938,488 | B2 | 9/2005 | Diaz et al. | 73/597 |
| 7,085,391 | B1 | 8/2006 | Yamaya | G10H 1/00 |
| 7,114,375 | B2 | 10/2006 | Panetta et al. | 73/61.75 |
| 7,246,522 | B1 | 7/2007 | Diaz et al. | 73/597 |
| 7,299,136 | B2 | 11/2007 | DiFoggio et al. | 702/22 |
| 7,330,797 | B2 | 2/2008 | Bailey et al. | G01F 23/00 |
| 7,359,803 | B2 | 4/2008 | Gysling et al. | G01N 31/00 |
| 7,363,174 | B2 | 4/2008 | Kishiro et al. | G01F 25/10 |
| 7,430,924 | B2 | 10/2008 | Gysling et al. | G01F 1/00 |
| 7,437,946 | B2 | 10/2008 | Gysling et al. | G01F 1/22 |
| 7,624,650 | B2 | 12/2009 | Gysling et al. | G01F 1/66 |
| 7,624,651 | B2 | 12/2009 | Fernald et al. | G01F 1/66 |
| 7,656,747 | B2 | 2/2010 | Mandal et al. | G01V 1/44 |
| 7,694,570 | B1 | 4/2010 | Dam et al. | 73/644 |
| 7,757,560 | B2 | 7/2010 | Hofmann | G01R 33/20 |
| 7,962,293 | B2 | 6/2011 | Gysling | G01F 1/76 |
| 7,966,882 | B2 | 6/2011 | Greenwood | 73/597 |
| 8,249,829 | B2 | 8/2012 | Vass et al. | G06F 19/00 |
| 8,346,491 | B2 | 1/2013 | Loose et al. | G01F 1/00 |
| 8,482,295 | B2 | 7/2013 | Sadri et al. | G01R 27/04 |
| 8,683,882 | B2 | 4/2014 | Jackson | G01N 9/24 |
| 8,820,182 | B2 | 9/2014 | Nikolay Nikolov et al. | H04Q 9/00 |
| 8,850,882 | B2 | 10/2014 | Qu et al. | G01F 23/296 |
| 8,915,145 | B1 | 12/2014 | Van Orsdol | G01F 1/74 |
| 9,057,677 | B2 | 6/2015 | Field | G01N 29/032 |
| 9,383,476 | B2 | 7/2016 | Trehan et al. | G01V 11/00 |
| 9,557,205 | B2 | 1/2017 | Kuroda et al. | G01F 23/28 |
| 9,772,311 | B2 | 9/2017 | Liljenberg et al. | G01N 29/032 |
| 9,816,848 | B2 | 11/2017 | Raykhman et al. | G01F 1/86 |
| 9,835,450 | B2 | 12/2017 | Deleye et al. | G01N 29/069 |
| 9,891,085 | B2 | 2/2018 | Muhammad et al. | G01F 1/88 |
| 9,903,840 | B2 | 2/2018 | Altpeter et al. | G01N 29/04 |
| 10,122,051 | B2 | 11/2018 | Kuhne et al. | H01M 10/484 |
| 10,180,410 | B2 | 1/2019 | Takahashi et al. | G01N 29/043 |
| 10,215,613 | B2 | 2/2019 | Kassubek et al. | G01F 23/296 |
| 10,458,871 | B2 | 10/2019 | Norli | G01L 11/04 |
| 10,794,871 | B1 | 10/2020 | Blackshire et al. | G01N 29/265 |
| 11,020,793 | B2 | 6/2021 | De Monte et al. | B22D 2/006 |
| 11,047,721 | B2 | 6/2021 | Schöb et al. | G01F 1/66 |
| 11,274,952 | B2 | 3/2022 | Bober et al. | G01F 1/66 |
| 11,293,791 | B2 | 4/2022 | Firouzi et al. | G01F 1/66 |
| 11,536,696 | B2 * | 12/2022 | Bivolarsky | G01N 29/44 |
| 11,585,690 | B2 | 2/2023 | Bivolarsky et al. | G01F 23/2965 |
| 11,729,537 | B2 * | 8/2023 | Heim | G01N 29/221 367/140 |
| 11,788,904 | B2 * | 10/2023 | Bivolarsky | G01K 3/14 374/100 |
| 2002/0170753 | A1 | 11/2002 | Clare | G01G 19/22 |
| 2002/0173230 | A1 | 11/2002 | Mayes | B24B 49/00 |
| 2004/0035208 | A1 | 2/2004 | Diaz et al. | G01N 29/18 |
| 2004/0079150 | A1 | 4/2004 | Breed et al. | 73/291 |
| 2004/0173021 | A1 | 9/2004 | Lizon et al. | 73/290 |
| 2004/0226615 | A1 | 11/2004 | Morikawa et al. | G01D 7/06 |
| 2005/0055136 | A1 | 3/2005 | Hofmann et al. | 700/273 |
| 2005/0102109 | A1 | 5/2005 | Dubois et al. | G01B 5/28 |
| 2005/0128873 | A1 | 6/2005 | LaBry | G01V 1/40 |
| 2005/0178198 | A1 | 8/2005 | Freger et al. | 73/290 |
| 2005/0247070 | A1 | 11/2005 | Arshansky et al. | 62/77 |
| 2006/0196224 | A1 | 9/2006 | Esslinger | 62/509 |
| 2007/0001028 | A1 | 1/2007 | Gysling | B05B 7/30 |
| 2007/0068248 | A1 | 3/2007 | Freger et al. | G01F 23/28 |
| 2007/0068253 | A1 | 3/2007 | Carodiskey | A61B 6/00 |
| 2007/0157737 | A1 | 7/2007 | Gysling et al. | G01F 1/667 |
| 2007/0205907 | A1 | 9/2007 | Schenk, Jr. | G08B 21/00 |
| 2008/0092623 | A1 | 4/2008 | Lynch et al. | G01N 29/02 |
| 2008/0101158 | A1 | 5/2008 | Hosseini et al. | G01S 15/00 |
| 2009/0007678 | A1 | 1/2009 | Fukutomi et al. | G02N 29/2487 |
| 2009/0143681 | A1 | 6/2009 | Jurvelin et al. | A61B 8/00 |
| 2010/0046576 | A1 | 2/2010 | Desai | G01K 11/22 |
| 2010/0111133 | A1 | 5/2010 | Yuhas et al. | G01K 17/00 |

(56) References Cited

U.S. PATENT DOCUMENTS

| | | | |
|---|---|---|---|
| 2010/0199779 A1 | 8/2010 | Liu et al. | G01F 1/663 |
| 2010/0218599 A1 | 9/2010 | Young et al. | G01F 23/296 |
| 2010/0242593 A1 | 9/2010 | Lagergren et al. | G01F 23/296 |
| 2010/0307249 A1 | 12/2010 | Lesage et al. | G01N 29/04 |
| 2011/0029262 A1 | 2/2011 | Barkhouse | 702/55 |
| 2011/0048551 A1 | 3/2011 | Tanaka et al. | 137/486 |
| 2011/0072904 A1 | 3/2011 | Lam et al. | G01N 29/04 |
| 2011/0120218 A1 | 5/2011 | Aldridge | 73/290 |
| 2011/0239769 A1 | 10/2011 | Schmitt et al. | G01N 29/02 |
| 2011/0271769 A1 | 11/2011 | Kippersund et al. | G01F 1/66 |
| 2011/0284288 A1 | 11/2011 | Sawyer et al. | E21B 49/005 |
| 2012/0024067 A1 | 2/2012 | Oberdoerfer et al. | G01N 29/00 |
| 2012/0055239 A1 | 3/2012 | Sinha | G01N 29/00 |
| 2012/0173169 A1 | 7/2012 | Skelding | G06F 19/00 |
| 2012/0222471 A1 | 9/2012 | Raykhman et al. | G01N 29/02 |
| 2012/0226159 A1 | 9/2012 | Sinclair et al. | G01S 7/52046 |
| 2012/0259560 A1 | 10/2012 | Woltring et al. | 702/55 |
| 2012/0262472 A1 | 10/2012 | Garr et al. | G06T 11/206 |
| 2012/0265454 A1 | 10/2012 | Rudd et al. | G01F 1/66 |
| 2012/0281096 A1 | 11/2012 | Gellaboina et al. | G01S 15/89 |
| 2013/0002443 A1 | 1/2013 | Breed et al. | G08B 21/00 |
| 2013/0041597 A1 | 2/2013 | Deleye et al. | G01N 29/043 |
| 2013/0068027 A1 | 3/2013 | Sullivan et al. | G01N 29/04 |
| 2013/0080081 A1 | 3/2013 | Dugger et al. | G01F 1/663 |
| 2013/0090575 A1 | 4/2013 | Rupp et al. | A61N 7/00 |
| 2013/0120155 A1 | 5/2013 | Hagg | G08C 19/16 |
| 2013/0128035 A1 | 5/2013 | Johns et al. | 348/135 |
| 2013/0213714 A1 | 8/2013 | Fuida | E21B 49/00 |
| 2014/0020478 A1 | 1/2014 | Ao et al. | G01F 1/66 |
| 2014/0027455 A1 | 1/2014 | Castellano et al. | B65D 88/34 |
| 2014/0076415 A1 | 3/2014 | Dunki-Jacobs et al. | E03C 1/02 |
| 2014/0107435 A1 | 4/2014 | Sharf et al. | A61B 8/00 |
| 2014/0223992 A1 | 8/2014 | Harper et al. | G01F 25/0084 |
| 2014/0301902 A1 | 10/2014 | Fernald et al. | B01J 19/10 |
| 2014/0375169 A1 | 12/2014 | Na et al. | H01L 41/08 |
| 2015/0068311 A1 | 3/2015 | Tanaka et al. | G01N 17/00 |
| 2015/0075278 A1 | 3/2015 | Dockendorff et al. | G01F 23/296 |
| 2015/0177045 A1 | 6/2015 | Cobianu et al. | G01F 23/296 |
| 2015/0198471 A1 | 7/2015 | Furlong et al. | G01F 1/66 |
| 2015/0212045 A1 | 7/2015 | Raykhman et al. | G01F 1/74 |
| 2015/0247751 A1 | 9/2015 | Kutlik et al. | G01F 23/2962 |
| 2015/0260003 A1 | 9/2015 | McHugh et al. | E21B 33/076 |
| 2015/0276463 A1 | 10/2015 | Milne et al. | G01F 23/296 |
| 2015/0369647 A1 | 12/2015 | Kumar et al. | G01F 23/284 |
| 2016/0025545 A1 | 1/2016 | Saltzgiver et al. | G01F 23/263 |
| 2016/0041024 A1 | 2/2016 | Reimer et al. | G01F 23/296 |
| 2016/0108730 A1 | 4/2016 | Fanini et al. | E21B 49/08 |
| 2016/0109304 A1 | 4/2016 | Yan et al. | G01K 15/00 |
| 2016/0146653 A1 | 5/2016 | Skelding | E21B 21/01 |
| 2016/0169839 A1 | 6/2016 | Gottlieb et al. | G01N 29/02 |
| 2016/0216141 A1 | 7/2016 | Leaders et al. | G01F 1/66 |
| 2016/0265954 A1 | 9/2016 | Bachmann et al. | G01F 1/667 |
| 2016/0320226 A1 | 11/2016 | Schaefer et al. | G01F 23/296 |
| 2017/0002954 A1 | 1/2017 | Brown et al. | F16K 37/0058 |
| 2017/0010144 A1 | 1/2017 | Lenner et al. | G01F 23/296 |
| 2017/0010145 A1 | 1/2017 | Lenner et al. | G01F 23/2962 |
| 2017/0010146 A1 | 1/2017 | Kassubek et al. | G01F 23/2962 |
| 2017/0059389 A1 | 3/2017 | Moore et al. | G01F 23/2968 |
| 2017/0082650 A1 | 3/2017 | Hies et al. | G01F 25/0007 |
| 2017/0087526 A1 | 3/2017 | Luharuka | B01F 15/00 |
| 2017/0102095 A1 | 4/2017 | Kunita et al. | F16K 37/0091 |
| 2017/0097322 A1 | 6/2017 | Giese et al. | G01N 29/07 |
| 2017/0199295 A1 | 7/2017 | Mandal | G01V 1/50 |
| 2017/0202595 A1 | 7/2017 | Shelton, IV | A61B 18/00 |
| 2017/0239741 A1 | 8/2017 | Furuta | B23H 1/10 |
| 2017/0268915 A1 | 9/2017 | Gestner et al. | G01F 1/66 |
| 2017/0295743 A1 | 10/2017 | Brown et al. | A01J 5/0133 |
| 2017/0309989 A1 | 10/2017 | Waelde et al. | H01Q 1/225 |
| 2018/0035603 A1 | 2/2018 | Kremmer et al. | A01C 7/20 |
| 2018/0044159 A1 | 2/2018 | Crouse et al. | B67D 1/0406 |
| 2018/0080809 A1 | 3/2018 | Tokarev et al. | G01F 23/2965 |
| 2018/0113663 A1 | 4/2018 | Jain | G06F 3/14 |
| 2018/0149505 A1 | 5/2018 | Ploss et al. | G01F 1/66 |
| 2018/0266874 A1 | 9/2018 | Montoya et al. | G01F 23/68 |
| 2018/0299317 A1 | 10/2018 | Truong et al. | G01F 23/2925 |
| 2018/0306628 A1 | 10/2018 | Parrott et al. | G01F 17/00 |
| 2018/0348169 A1 | 12/2018 | Lee et al. | G01N 29/11 |
| 2019/0011304 A1 | 1/2019 | Cunningham et al. | G01F 17/00 |
| 2019/0063984 A1 | 2/2019 | Bowley | G01F 23/2962 |
| 2019/0078927 A1 | 3/2019 | Takayama et al. | G01F 23/2965 |
| 2019/0137310 A1 | 5/2019 | Xiao et al. | G01F 1/06 |
| 2019/0154480 A1 | 5/2019 | Schöb et al. | G01F 1/662 |
| 2019/0195629 A1 | 6/2019 | Vaissiere | G01C 9/00 |
| 2019/0195830 A1 | 6/2019 | Tamura et al. | |
| 2019/0272496 A1 | 9/2019 | Moeller | G06Q 10/087 |
| 2019/0368908 A1 | 12/2019 | Aughton et al. | G01F 1/66 |
| 2020/0018628 A1 | 1/2020 | Head et al. | G21C 17/022 |
| 2020/0182736 A1 | 6/2020 | Kim et al. | G01M 3/2807 |
| 2020/0195449 A1 | 6/2020 | Obaidi | H04L 9/38 |
| 2020/0200711 A1 | 6/2020 | Fehran et al. | G01N 29/024 |
| 2020/0378283 A1 | 12/2020 | Zhang et al. | F01M 11/10 |
| 2020/0378812 A1 | 12/2020 | Heim | G01F 1/667 |
| 2020/0378818 A1 | 12/2020 | Heim et al. | G01F 23/296 |
| 2021/0382014 A1 | 12/2021 | Xu et al. | G01N 29/24 |
| 2022/0034850 A1 | 2/2022 | Zhang et al. | G01N 29/22 |
| 2022/0178879 A1 | 6/2022 | Bivolarsky et al. | G02N 29/028 |
| 2022/0178881 A1 | 6/2022 | Bivolarsky et al. | G01N 29/04 |
| 2022/0276102 A1 | 9/2022 | Bivolarsky et al. | G01K 11/24 |
| 2023/0258488 A1 | 8/2023 | Coleman et al. | G01F 1/66 |

FOREIGN PATENT DOCUMENTS

| | | | | |
|---|---|---|---|---|
| CN | 105548370 | | 5/2016 | G01N 29/24 |
| DE | 10 2010 029 254 | | 12/2011 | F01N 3/10 |
| EP | 0372700 | | 6/1990 | G01F 23/28 |
| EP | 2450701 | | 5/2012 | G01N 29/22 |
| EP | 2962096 | | 8/2019 | G01L 1/255 |
| GB | 2192717 | | 1/1990 | G01N 29/00 |
| JP | H1073385 | A * | 3/1998 | |
| JP | 2000314651 | | 11/2000 | G01F 23/28 |
| JP | 2002340654 | A * | 11/2002 | |
| JP | 2013140029 | A * | 7/2013 | F01K 5/02 |
| KR | 200174618 | | 3/2000 | G01N 29/24 |
| WO | WO 87/04793 | | 8/1987 | G01N 29/00 |
| WO | WO 8809895 | | 12/1988 | F16K 37/00 |
| WO | WO9010849 | | 9/1990 | G01F 23/28 |
| WO | WO-9010849 | A1 * | 9/1990 | |
| WO | WO 2007/149605 | | 12/2007 | |
| WO | WO2008079202 | | 7/2008 | G01F 3/36 |
| WO | WO 2009/154719 | | 12/2009 | G01F 17/00 |
| WO | WO 2014/021846 | | 2/2014 | G01F 1/66 |
| WO | WO 2014/167471 | | 10/2014 | G01F 23/30 |
| WO | WO 2020/136945 | | 7/2020 | G01F 23/296 |

OTHER PUBLICATIONS

Amjad, Umar et al. "Change in time-to-flight of longitudinal (axisymmetric) wave modes due to lamination in steel pipes" Proceedings of SPIE vol. 8695, Health Monitoring of Structural and Biological Systems 2013, 869515 (Apr. 17, 2013); 10 pgs.

Amjad, Umar et al., "Effects of transducers on guided wave based structural health monitoring" Proceedings of SPIE, vol. 10600, Health Monitoring of Structural and Biological Systems XII, 106000F (Apr. 23, 2018), 10 pgs.

Amjad, U. et al., "Generalized representations and universal aspects of Lamb wave dispersion relations" Proceedings of SPIE, vol. 7650, Health Monitoring of Structural and Biological Systems 2010, 76502F (Apr. 8, 2010), 9 pgs.

Amjad, Umar et al., "Detection and quantification of pipe damage from change in time of flight and phase" *Ultrasoncis* vol. 62 (2015) pp. 223-236, Jun. 11, 2015, 14 pgs.

Amjad, Umar et al., "Detection and quantification of diameter reduction due to corrosion in reinforcing steel bars" *Structural Health Monitoring* 2015, vol. 14(5) 532-543, 12 pgs.

Amjad, Umar et al., "Detection and quantification of delamination in laminated plates from the phase of appropriate guided wave modes" *Optical Engineering* 55(1), Jan. 2016, 11 pgs.

(56) References Cited

OTHER PUBLICATIONS

API: American Petroleum Institute Preliminary Program, Oct. 16-17, 2019, 5 pages.
Hassanzadeh et al., "Investigation of factors affecting on viscosity reduction of sludge from Iranian crude oil storage tanks", Petroleum Science, vol. 15, Jul. 2018, pp. 634-643.
Kak et al., "Principles of Computerized Tomograhic Imaging", IEEE, 1988, Chapter 2, 48 pgs.
Pandey, "Ultrasonic attenuation in condensed matter", Dissertation for V.B.S. Purvanchal University, 2009, Chapter 1, pp. 1-33.
Pluta et al., "Stress Dependent Dispersion Relations of Acoustic Waves Travelling on a Chain of Point Masses Connected by Anharmonic Linear and Torsional Springs" *International Congress on Ultrasonics* AIP Conf. Proc. 1433, 471-474 (2012); 5 pgs.
Shelke, et al., "Mode-Selective Excitation and Detection of Ultrasonic Guided Waves for Delamination Detection in Laminated Aluminum Plates" IEEE Transactions on Ultrasonics, Ferroelectrics, and Frequency Control, vol. 58, No. 3, Mar. 2011, 11 pgs.
"TOPS Terminal Operating Practices Symposium" Program Agenda, Apr. 11, 2018, 1 page.
Zadler, et al., "Resonant Ultrasound Spectroscopy: theory and application", Geophysical Journal International, vol. 156, Issue 1, Jan. 2004, pp. 154-169.
Examination Report No. 1 issued in Australian Application No. 2020283140 dated Jan. 4, 2022, 6 pgs.
Examination Report No. 1 issued in Australian Patent Application No. 2020302919, dated Feb. 15, 2022, 4 pgs.
International Search Report and Written Opinion issued in PCT/US20/35404, dated Aug. 24, 2020, 11 pages.
International Search Report and Written Opinion issued in PCT/US20/39966, dated Sep. 18, 2020, 13 pages.
International Preliminary Report on Patentability issued in PCT/US20/35404 dated Nov. 16, 2021, 8 pgs.
International Preliminary Report on Patentability issued in PCT/US20/39966 dated Dec. 28, 2021, 10 pgs.
Notice of Allowance issued in U.S. Appl. No. 16/888,469, dated Dec. 23, 2020, 16 pgs.
Notice of Allowance issued in U.S. Appl. No. 17/148,122 dated Jun. 16, 2021, 8 pgs.
Notice of Allowance issued in U.S. Appl. No. 16/914,092 dated Oct. 28, 2021, 14 pgs.
Office Action issued in Canadian Patent Application No. 3,140,008, dated Feb. 14, 2022, 4 pgs.
Office Action issued in U.S. Appl. No. 16/888,469, dated Aug. 5, 2020, 8 pages.
Office Action issued in U.S. Appl. No. 16/888,469, dated Sep. 8, 2020, 20 pages.
Office Action issued in U.S. Appl. No. 16/914,092, dated Nov. 10, 2020, 22 pgs.
Office Action issued in U.S. Appl. No. 16/914,092, dated Mar. 1, 2021, 25 pgs.
Office Action issued in U.S. Appl. No. 16/914,092, dated Jun. 24, 2021, 24 pgs.
Office Action issued in U.S. Appl. No. 17/148,122, dated Mar. 2, 2021, 26 pgs.
International Search Report and Written Opinion issued in PCT/US21/61962 dated Feb. 16, 2022, 9 pgs.
International Search Report and Written Opinion issued in PCT/US21/61924 dated Feb. 16, 2022, 9 pgs.
International Search Report and Written Opinion issued in PCT/US21/62010 dated Feb. 16, 2022, 9 pgs.
International Search Report and Written Opinion issued in PCT/US21/61970 dated Feb. 18, 2022, 17 pgs.
International Search Report and Written Opinion issued in PCT/US21/61925 dated Feb. 18, 2022, 9 pgs.
International Search Report and Written Opinion issued in PCT/US2021/061646 dated Feb. 25, 2022, 9 pgs.
International Search Report and Written Opinion issued in PCT/US2021/065665 dated Mar. 11, 2022, 9 pgs.
International Search Report and Written Opinion issued in PCT/US2021/062001 dated Mar. 9, 2022, 9 pgs.
International Search Report and Written Opinion issued in PCT/US21/61926 dated Mar. 8, 2022, 9 pgs.
Notice of Acceptance issued in Australian Application No. 2020302919 dated Mar. 2, 2022, 4 pgs.
Notice of Acceptance issued in Australian Application No. 2020283140 dated Mar. 30, 2022, 4 pgs.
Notice of Allowance issued in Canadian Application No. 3,140,008 dated May 5, 2022, 1 pg.
Office Action issued in Australian Patent Application No. 2020283140, dated Mar. 18, 2022, 5 pgs.
Office Action issued in U.S. Appl. No. 17/543,200, dated Mar. 9, 2022, 8 pages.
Office Action issued in U.S. Appl. No. 17/542,461, dated Mar. 10, 2022, 18 pages.
Office Action issued in U.S. Appl. No. 17/542,465, dated Mar. 11, 2022, 22 pages.
Office Action issued in U.S. Appl. No. 17/542,872, dated Mar. 17, 2022, 21 pages.
Office Action issued in U.S. Appl. No. 17/566,020, dated Mar. 18, 2022, 20 pages.
Office Action issued in U.S. Appl. No. 17/541,036, dated Mar. 31, 2022, 22 pages.
Office Action issued in U.S. Appl. No. 17/543,152, dated Apr. 19, 2022, 17 pages.
Office Action issued in U.S. Appl. No. 17/542,814, dated Apr. 25, 2022, 21 pages.
Vermeersch, "Influence of substrate thickness on thermal impedance of microelectronic structures", Microelectronics Reliability, 47, 2007, pp. 437-443.
U.S. Appl. No. 17/543,152, filed Dec. 6, 2021, Bivolarsky et al.
U.S. Appl. No. 17/542,814, filed Dec. 6, 2021, Burcham et al.
U.S. Appl. No. 17/542,461, filed Dec. 5, 2021, Burcham et al.
U.S. Appl. No. 17/542,465, filed Dec. 5, 2021, Bivolarsky et al.
U.S. Appl. No. 17/542,872, filed Dec. 6, 2021, Bivolarsky et al.
U.S. Appl. No. 17/543,200, filed Dec. 6, 2021, Bivolarsky et al.
Gurkov, Andrey "Gigantic Druzhba oil pipeline paralyzed for weeks" May 7, 2019, 3 pages, https://www.dw.com/en/gigantic-druzhba-oil-pipeline-paralyzed-for-weeks/a-48638989.
Luck, Marissa "Deer Park fire a 'blemish' for the petrochemical industry's image" *Houston Chronicle*, Mar. 26, 2019, 7 pages https://www.houstonchronicle.com/business/energy/article/Deer-Park-fire-a-blemish-for-the-image-of-13717661.php.
Office Action issued in U.S. Appl. No. 17/542,461, dated Jun. 27, 2022, 13 pages.
Office Action issued in U.S. Appl. No. 17/566,020, dated Jul. 12, 2022, 20 pages.
Office Action issued in U.S. Appl. No. 17/543,200, dated Jul. 20, 2022, 25 pages.
Office Action issued in U.S. Appl. No. 17/746,622, dated Jul. 22, 2022, 19 pages.
Office Action issued in U.S. Appl. No. 17/541,036, dated Aug. 9, 2022, 22 pages.
Office Action issued in U.S. Appl. No. 17/746,640, dated Aug. 18, 2022, 19 pages.
Notice of Allowance issued in U.S. Appl. No. 17/542,465, dated Jul. 11, 2022, 18 pages.
Notice of Allowance issued in U.S. Appl. No. 17/542,872, dated Jul. 11, 2022, 13 pages.
Notice of Allowance issued in U.S. Appl. No. 17/543,152, dated Jul. 29, 2022, 16 pages.
Office Action issued in U.S. Appl. No. 17/542,814, dated Aug. 26, 2022, 22 pages.
Office Action issued in U.S. Appl. No. 17/540,021, dated Sep. 15, 2022, 40 pages.
Office Action issued in U.S. Appl. No. 17/566,020, dated Nov. 14, 2022, 21 pgs.
Notice of Allowance issued in U.S. Appl. No. 17/542,461, dated Oct. 23, 2022, 9 pages.
Notice of Allowance issued in U.S. Appl. No. 17/543,200, dated Nov. 3, 2022, 16 pages.

(56) References Cited

OTHER PUBLICATIONS

Notice of Allowance issued in U.S. Appl. No. 17/746,622, dated Nov. 8, 2022, 16 pages.
Notice of Allowance issued in U.S. Appl. No. 17/540,021, dated Mar. 6, 2023, 10 pgs.
Notice of Allowance issued in U.S. Appl. No. 17/541,036, dated Mar. 31, 2023, 9 pgs.
Office Action issued in U.S. Appl. No. 17/566,020, dated Apr. 3, 2023, 20 pgs.
Office Action issued in U.S. Appl. No. 17/542,814, dated Apr. 6, 2023, 17 pgs.
Supplementary Partial EP Search Report issued in EP20 813 097.1, dated Jan. 13, 2023, 16 pgs.
U.S. Appl. No. 17/540,021, filed Dec. 1, 2021, Heim et al.
U.S. Appl. No. 17/541,036, filed Dec. 2, 2021, Heim et al.
U.S. Appl. No. 17/746,640, filed May 17, 2022, Bivolarsky et al.
U.S. Appl. No. 17/542,814, filed Dec. 6, 2021, Bivolarsky et al.
U.S. Appl. No. 18/111,376, filed Feb. 17, 2023, Bivolarsky et al.
U.S. Appl. No. 17/566,020, filed Dec. 30, 2021, Bivolarsky et al.
U.S. Appl. No. 18/109,022, filed Feb. 13, 2023, Coleman et al.
International Search Report and Written Opinion issued in PCT/US23/12923 dated May 3, 2023, 9 pgs.
Notice of Allowance issued in U.S. Appl. No. 17/746,640, dated May 12, 2023, 15 pgs.
Office Action issued in U.S. Appl. No. 18/109,022, dated May 5, 2023, 18 pgs.
Office Action issued in U.S. Appl. No. 18/111,376, dated Jun. 15, 2023, 28 pgs.
Office Action issued in U.S. Appl. No. 17/566,020, dated Jul. 14, 2023, 20 pgs.
Office Action issued in U.S. Appl. No. 17/542,814, dated Jul. 19, 2023, 25 pgs.
Supplementary European Search Report issued in EP Application No. 20 813 097.1, dated May 24, 2023, 20 pgs.
Supplementary Partial European Search Report issued in EP Application No. 20 832 739.5, dated May 25, 2023, 16 pgs.
International Search Report and Written Opinion issued in PCT/US23/022505 dated Jul. 21, 2023, 9 pgs.
International Search Report and Written Opinion issued in PCT/US23/022511 dated Jul. 28, 2023, 14 pgs.
European Search Report issued in EP Application No. 20832739.5, dated Sep. 6, 2023, 14 pgs.
Office Action issued in U.S. Appl. No. 17/566,020, dated Oct. 23, 2023, 8 pgs.
Office Action issued in U.S. Appl. No. 18/142,467, dated Dec. 6, 2023, 11 pgs.
Notice of Allowance issued in U.S. Appl. No. 18/223,987, dated Nov. 21, 2023, 8 pgs.
U.S. Appl. No. 18/142,467, filed May 2, 2023, Heim et al.
U.S. Appl. No. 18/223,987, filed Jul. 19, 2023, Bivolarsky et al.

* cited by examiner

MULTI-BOUNCE ACOUSTIC SIGNAL MATERIAL DETECTION

CROSS REFERENCE TO RELATED APPLICATION

This application claims benefit of U.S. Provisional Application Ser. No. 63/121,733 entitled, "Multi-Bounce Acoustic Signal Material Detection" filed Dec. 4, 2020, the entire disclosure of which is incorporated herein by reference.

FIELD OF THE DISCLOSURE

The present disclosure is generally related to material detection and more particularly is related to multi-bounce acoustic signal material detection.

BACKGROUND OF THE DISCLOSURE

It is important to know the amount of fluid within a fluid storage container, such as those used in industrial and commercial settings, for instance, within the gas and oil industry. While there are devices used to detect a fluid level from inside the container, to detect the fluid level from the outside of the container is a challenging proposition. This is especially true in the case of oil and gas tanks used in refineries or in underground fuel tanks at gas stations, where it is impractical or near impossible to gain access to the outside of a tank. Problems arise due to the size of the container and the need to measure the volume and amount of fluids precisely.

In some situations, it is possible to measure only inflow and the outflow of the fluid within the container by monitoring the inlet and outlet pipes that connect to a container. However, merely measuring inflow and outflow does not detect or account for the sedimentation levels that often occur in the container over time. For instance, with crude oil containers, water and sediment or sludge are components of the crude oil, and after a period of time, they will settle into layers within the container. A sludge layer, mostly formed from crystalized paraffin wax, will form along the bottom surface of the container and it will occupy space within the container.

For a container which experiences inflow and outflow over a long period of time, these sedimentation levels can build up and reduce the internal storage volume of the container. Thus, it is important to monitor the levels of the various layers of materials within containers. Cleaning the interior of the container is often an expensive and time-consuming procedure, so it is beneficial to know when the sedimentation in the container reaches a level where it needs to be cleaned, maintained, or otherwise attended to. Additionally, it is highly important to detect sedimentation build up within a container since sedimentation can decrease the available space for storing fluids, such as crude oil.

Thus, a heretofore unaddressed need exists in the industry to address the aforementioned deficiencies and inadequacies.

SUMMARY OF THE DISCLOSURE

Embodiments of the present disclosure provide a system, methods, and an apparatus for multi-bounce acoustic signal material detection. Briefly described, in architecture, one embodiment of the apparatus, among others, can be implemented as follows. The apparatus for multi-bounce acoustic signal material detection includes a container containing a quantity of material within an interior space thereof, wherein the quantity of material has at least two segmented layers. First and second acoustic sensors are positioned on a sidewall of the container, wherein the first acoustic sensor is positioned at a different height along the sidewall than the second acoustic sensor. An acoustic signal is transmitted into the sidewall of the container from the first acoustic sensor, wherein the acoustic signal reflects between an interior surface of the sidewall and an exterior surface of the sidewall until it is received at the second acoustic sensor, and wherein a border between the at least two segmented layers of the quantity of material is detectable based on the acoustic signal.

The present disclosure can also be viewed as providing an apparatus for multi-bounce acoustic signal material detection. Briefly described, in architecture, one embodiment of the apparatus, among others, can be implemented as follows. A container contains a quantity of material within an interior space thereof, wherein the quantity of material has at least two segmented layers. First and second acoustic sensors are positioned on a sidewall of the container, wherein the first acoustic sensor is positioned at a different height along the sidewall than the second acoustic sensor. An acoustic signal is transmitted into the sidewall of the container from the first acoustic sensor, wherein the acoustic signal reflects between an interior surface of the sidewall and an exterior surface of the sidewall until it is received at the second acoustic sensor. At least one computing device is in communication with the first and second acoustic sensors, wherein a border between the at least two segmented layers of the quantity of material is detectable based on a calculated energy loss of the acoustic signal from a number of reflections of the acoustic signal between the interior surface of the sidewall and an exterior surface of the sidewall above and below the border between the at least two segmented layers of the quantity of material.

The present disclosure can also be viewed as providing methods for multi-bounce acoustic signal material detection. In this regard, one embodiment of such a method, among others, can be broadly summarized by the following steps: providing a container containing a quantity of material within an interior space thereof, wherein the quantity of material has at least two segmented layers; positioning first and second acoustic sensors on a sidewall of the container, wherein the first acoustic sensor is positioned at a different height along the sidewall than the second acoustic sensor; transmitting an acoustic signal into the sidewall of the container from the first acoustic sensor, whereby the acoustic signal reflects between an interior surface of the sidewall and an exterior surface of the sidewall; receiving the acoustic signal reflected through the sidewall at the second acoustic sensor; and determining a border between the at least two segmented layers of the quantity of material based on the received acoustic signal.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

The subject disclosure is directed to improved material detection within vessels, containers, and similar storage facilities which contain, transport, or otherwise hold materials, namely fluids or liquids, such as, for example, petroleum products and chemicals. Acoustic sensors are used to determine material levels within the containers and/or to determine segmented boundaries of the material, or multiple materials, within the containers. For instance, it is possible to detect a material level which reaches a predetermined high location within a container or a predetermined low location within the container, where these predetermined high and low locations can correspond to high fill levels and low fill levels, respectively, in the container. It is also possible to determine a boundary between a material which has separated into two or more distinct layers, such as with a fluid which experiences sedimentation settling or separation, e.g., as may occur with oil-based materials and water-based materials over a period of time.

Figure 1:
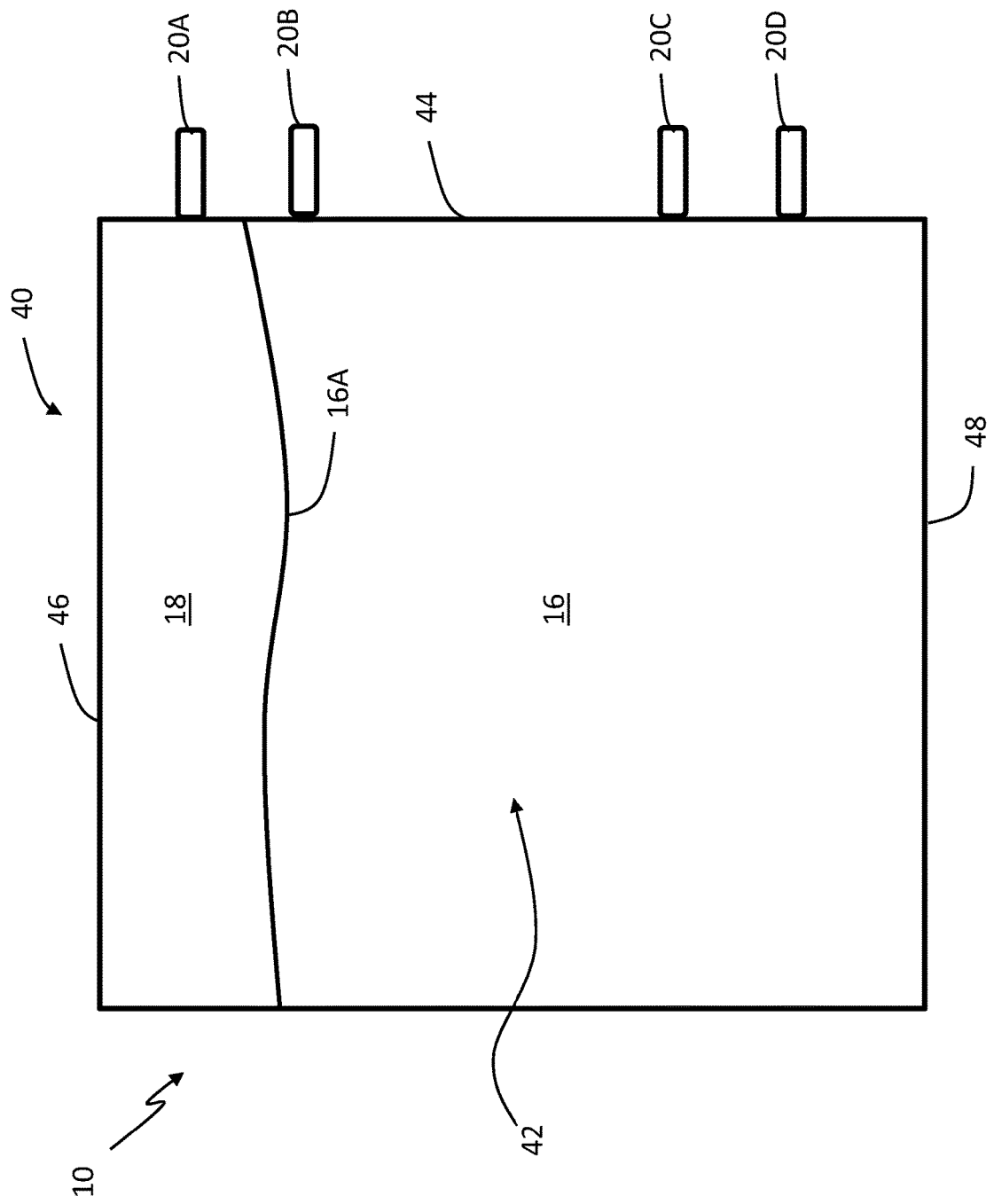
FIG. 1 is a diagrammatical cross-sectional illustration of an apparatus for acoustic signal material detection, in accordance with a first exemplary embodiment of the present disclosure.

At a general level, FIG. 1 is a diagrammatical cross-sectional illustration of an apparatus for acoustic signal material detection 10, in accordance with a first exemplary embodiment of the present disclosure. As shown in FIG. 1, the apparatus for acoustic signal material detection 10, which may be referred to herein simply as 'apparatus 10' includes a container 40 which contains one or more material 16, commonly a liquid, fluid, or viscous material. While any type of fluid material may be included in the container 40, for clarity in disclosure, the subject disclosure uses an example of crude oil as the material 16 within the container 40. The material 16 occupies an interior portion 42 or interior space of the container 40. Since the material 16 does not fully and entirely fill the interior portion 42 of the container, a layer of atmospheric air 18 or similar gas is positioned above the material 16.

A plurality of acoustic sensors 20A-20D or transducers are positioned along a sidewall 44 of the container 40 along various heights of the sidewall 44. The location at which these acoustic sensors 20A-20D are placed is on the exterior surface of the container 40, and the specific height may be selected to measure the properties of the material 16 therein at the corresponding height. For example, acoustic sensors 20A-20B are positioned near the top surface 46 of the container 40 while acoustic sensors 20C-20D are positioned near the bottom surface 48 of the container 40. These acoustic sensors 20A-20D act as "level" sensors and can be positioned in locations such as 'high" (20B) and "low" (20C) or "high-high" (20A) and "low-low" (20D). As the level of the material 16 within the container 40 increases and decreases, the acoustic sensors 20A-20D can determine when the upper surface 16A of the material 16 passes by one or more of the acoustic sensors 20A-20D. In this way, movement of the material 16 surface level 16A within the container 40 can be detected and an alert can be sent if the level is too high or too low. Importantly, the acoustic sensors 20A-20B may be used to prevent an overfill situation, whereby when the upper surface 16A of the material 16 passes by acoustic sensor 20B, it can provide a warning or alert to an operator to stop filling the container 40. If the upper surface 16A is detected at acoustic sensor 20A, the system 10 may sound an alarm or automatically cease a filling operation, such as by shutting off a valve on the inlet of the container 40.

Figure 2:
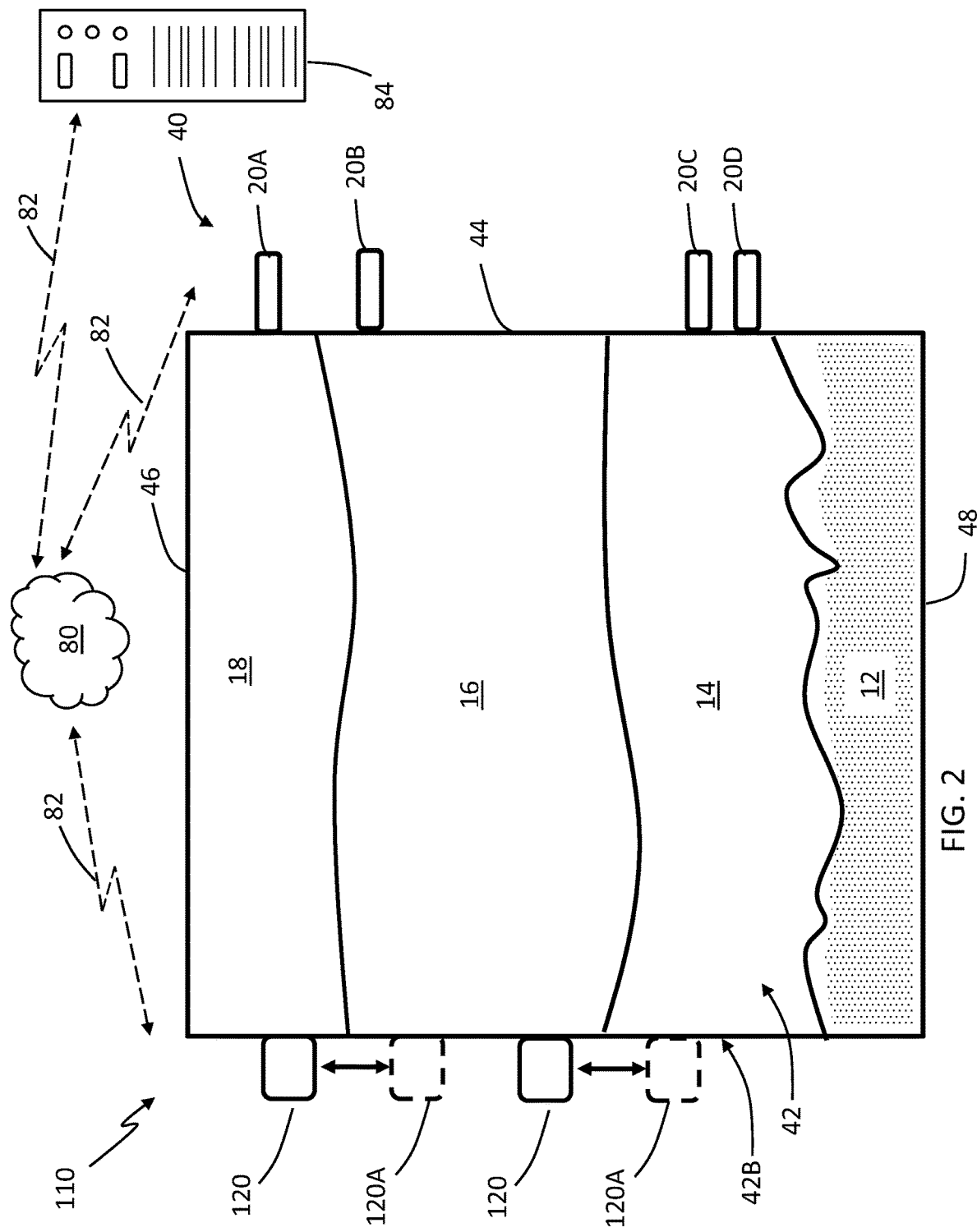
FIG. 2 is a diagrammatical cross-sectional illustration of an apparatus for multi-bounce acoustic signal material detection, in accordance with a second exemplary embodiment of the present disclosure.
Figure 3:
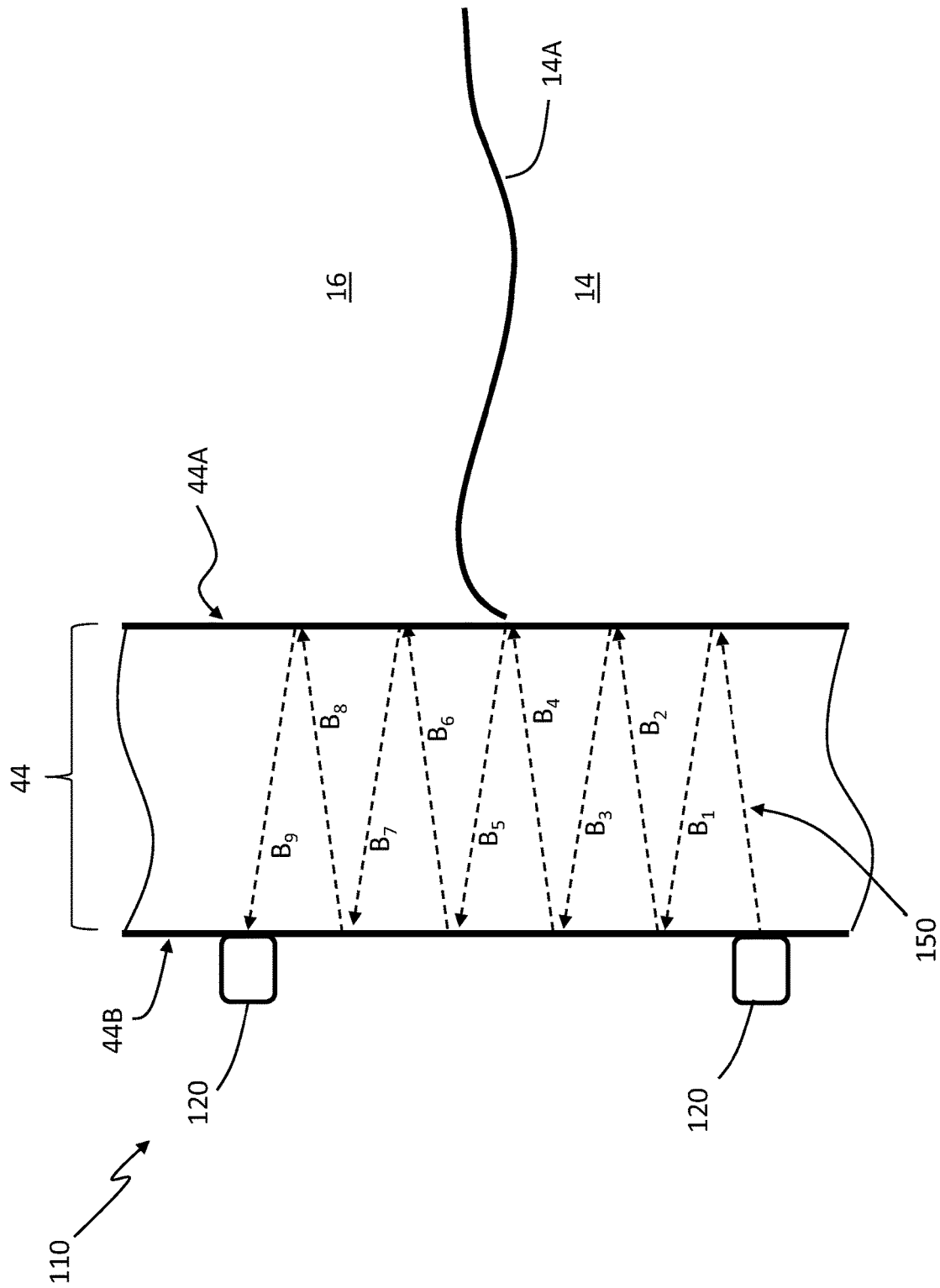
FIG. 3 is a diagrammatical cross-sectional illustration of the apparatus for multi-bounce acoustic signal material detection of FIG. 2 shown in detail, in accordance with the second exemplary embodiment of the present disclosure.

While FIG. 1 illustrates a system 10 which can generally provide material fill level detection, there is a need to determine material fill level within a container at any given point in time, and to determine the quantities of multiple materials within a single container. To solve this larger issue of how much material is in a container at any moment, in addition to determining critical levels, it is possible to transmit an acoustic signal within a sidewall of the container to determine material levels. FIG. 2 is a diagrammatical cross-sectional illustration of an apparatus for multi-bounce acoustic signal material detection 110, in accordance with a second exemplary embodiment of the present disclosure. The apparatus for multi-bounce acoustic signal material detection 110, which may be referred to herein simply as 'apparatus 110' utilizes two or more acoustic sensors 120 and an acoustic signal transmitted therebetween within the sidewall 44 of the container 40, such that the acoustic signal bounces inside the sidewall 44 of the container 40 itself. In particular, the acoustic signal reflects between the exterior surface of the sidewall 44 and the interior surface of the sidewall 44. FIG. 3 is a diagrammatical cross-sectional illustration of the apparatus for multi-bounce acoustic signal material detection of FIG. 2 shown in detail, in accordance with the second exemplary embodiment of the present disclosure.

With reference to FIGS. 2-3, the apparatus 110 may include the level detection sensors 20A-20D, as described relative to FIG. 1. Additionally, two or more acoustic sensors 120 are positioned on the exterior of the sidewall 44 of the container 40, such as by attachment to the exterior surface 44B of the sidewall 44. It is possible for the position of the acoustic sensors 120 to be positioned at a stationary height on the container 40, or to be adjustable in height, such that they can be moved vertically along the sidewall 44. For instance, as shown in FIG. 2, the acoustic sensors 120 can be adjusted up or down to be located in new positions, as indicated at 120A. Height adjustment can be made through any technique, such as manually, automated, or semi-automated. The acoustic sensors 120 may be positioned substantially in vertical alignment at different heights along the container 40.

The container 40, while intending to hold a single material, such as crude oil, may eventually be segmented into material layers due to settling and separation of the material. For example, the material 16 may settle over time whereby parts of the material separate based on their natural density, or suspended solids within the material may accumulate over time and separate from the liquid material, among other examples. While any fluid or material may be used, in accordance with this disclosure, the material 16 is exemplary described as crude oil, which may separate into a sedimentation or sludge layer 12, a water layer 14 positioned above the sludge 12, the crude oil 16 layer which is positioned above the water layer 14, and an air layer 18 positioned near the top of the container 40. These layers are depicted in FIG. 2. Each of these layers may have a boundary with an abutting layer, for example, the top surface of the water layer 14A is depicted in FIG. 3 as being the boundary between the water layer 14 and the crude oil 16 layer.

As shown best in FIG. 3, when the apparatus is in use, the apparatus 110 transmits an acoustic signal 150 from one of the acoustic sensors 120. In FIG. 3, the signal is transmitted from the lower acoustic sensor 120. The acoustic signal 150 moves through the sidewall 44 of the container 40 until it reaches the interior surface 44A thereof, at which point it is reflected back towards the exterior surface 44B. The acoustic wave 150 continues reflecting or bouncing between the interior and exterior surfaces 44A, 44B of the sidewall 44 until it reaches another acoustic sensor 120, e.g., the upper acoustic sensor 120 shown in FIG. 3. Depending on the material that the sidewall 44 is constructed from, and the materials 14, 16 within the container 40, parameters of the transmitted signal 150 may be adjusted, for instance, the angle, frequency, type of wave, and/or the strength of the signal 150.

It is noted that both acoustic sensors 120 are connected and synchronized to facilitate time-of-flight measurement of the signal 150 therebetween. The acoustic sensor 120 which receives the signal 150 may control the phase shift of the signal 150 transmitted from the sending sensor 120 to maximize the signal 150. In this process, measurements of both the thickness of the sidewall 44 of the container 40 and the level of the fluid 14/16 inside the container 40 can be taken by determining the number of bounces or reflections that the signal 150 has taken before the signal passes by the impedance barrier formed between the abutment of the material layers. For example, the impedance barrier formed between the water 14 and the crude oil 16 which occurs at surface 14A, as shown in FIG. 3, and the apparatus 110 can determine that four individual signal bounces, $B_1$, $B_2$, $B_3$, and $B_4$, occurred between the acoustic sensor 120 transmitting the signal 150 and the impedance barrier at 14A.

At the time of setup, a measurement of the material of the sidewall 44 density and speed of sound are taken. The apparatus 110 is also configured to take a certain number of bounces in the sidewall 44 by adjusting frequency and angle of transmission of the acoustic wave 150 by using devices which position the acoustic wave 150 transmission as desired, for instance, a variable angle sensor, a wedge, or another mounting device.

Figure 4:
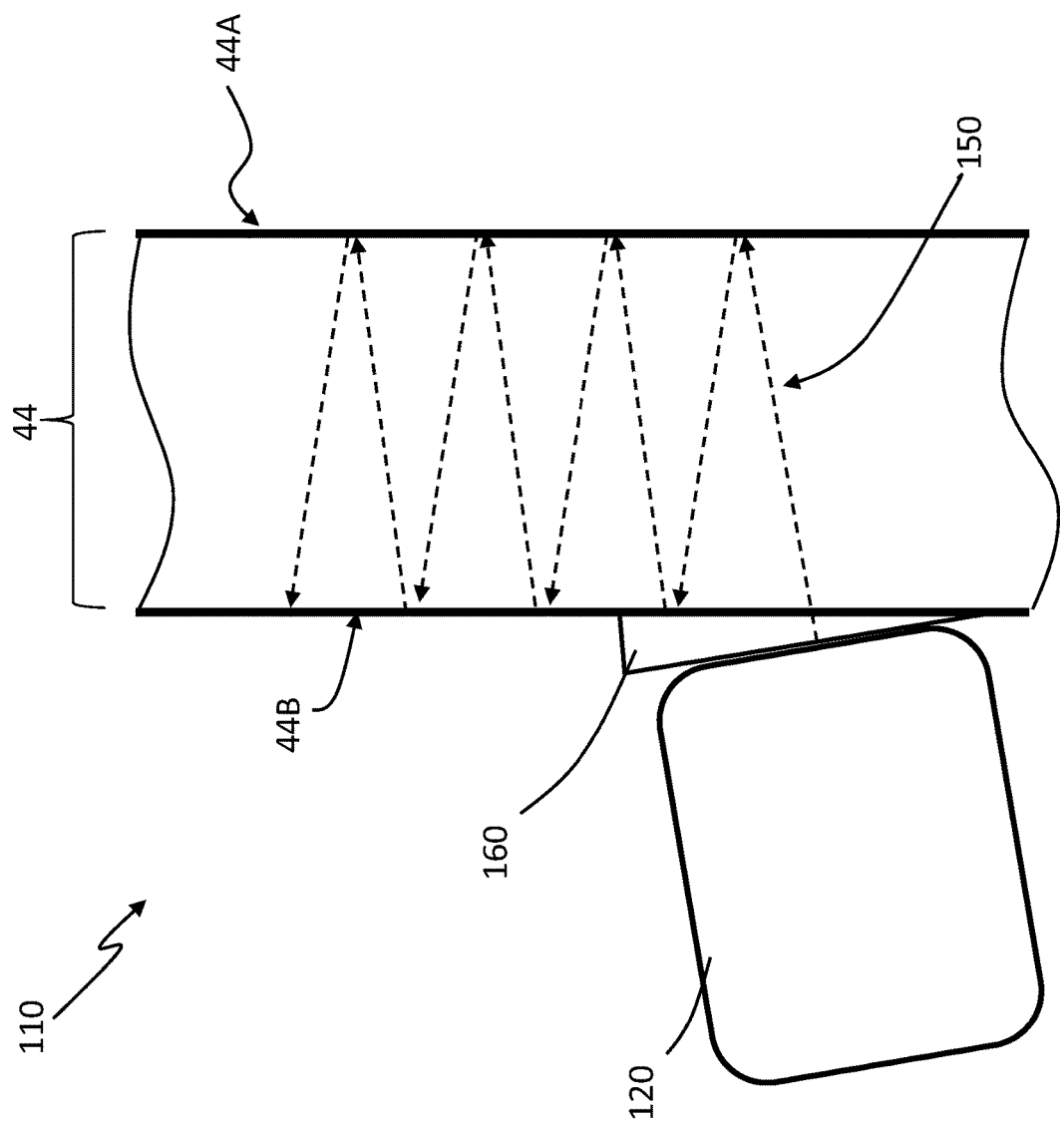
FIG. 4 is a diagrammatical cross-sectional illustration of the apparatus for multi-bounce acoustic signal material detection, in accordance with the second exemplary embodiment of the present disclosure.

FIG. 4 is a diagrammatical cross-sectional illustration of the apparatus for multi-bounce acoustic signal material detection 110, in accordance with the second exemplary embodiment of the present disclosure, and FIG. 4 illustrates an example of a wedge mounting device 160 which is used to position the acoustic sensor 120 at the desired angle. The wedge mounting device 160 may be static, or it may be adjustable whereby the user can manipulate mechanical components of the wedge mounting device 160 to increase or decrease the angle at which the acoustic sensor 120 transmits the signal 150 into the sidewall 44 such that the angle is a non-perpendicular angle relative to the sidewall. The angle variability allows for measurement of the material level with increased accuracy. However, the signal may require a higher signal strength due to longer travel time and material attenuation when the acoustic sensor 120 is positioned angularly on the sidewall 44. Using a sheer wave through the sidewall 44 of the container 40 may act to increase the amount of energy that is transmitted, in some cases, by more than double. However, the shear waves are generated with smaller initial energy.

The initial setup may also include utilizing mobile sensors 120 to determine the initial locations for both of the two or more acoustic sensors 120, or a group of acoustic sensors 120. While at least two sensors are needed to create a functioning device, it is possible to use any greater number of acoustic sensors 120. For example, more than two acoustic sensors 120 may be necessary if the container 40 is currently empty or near empty.

Figure 5:
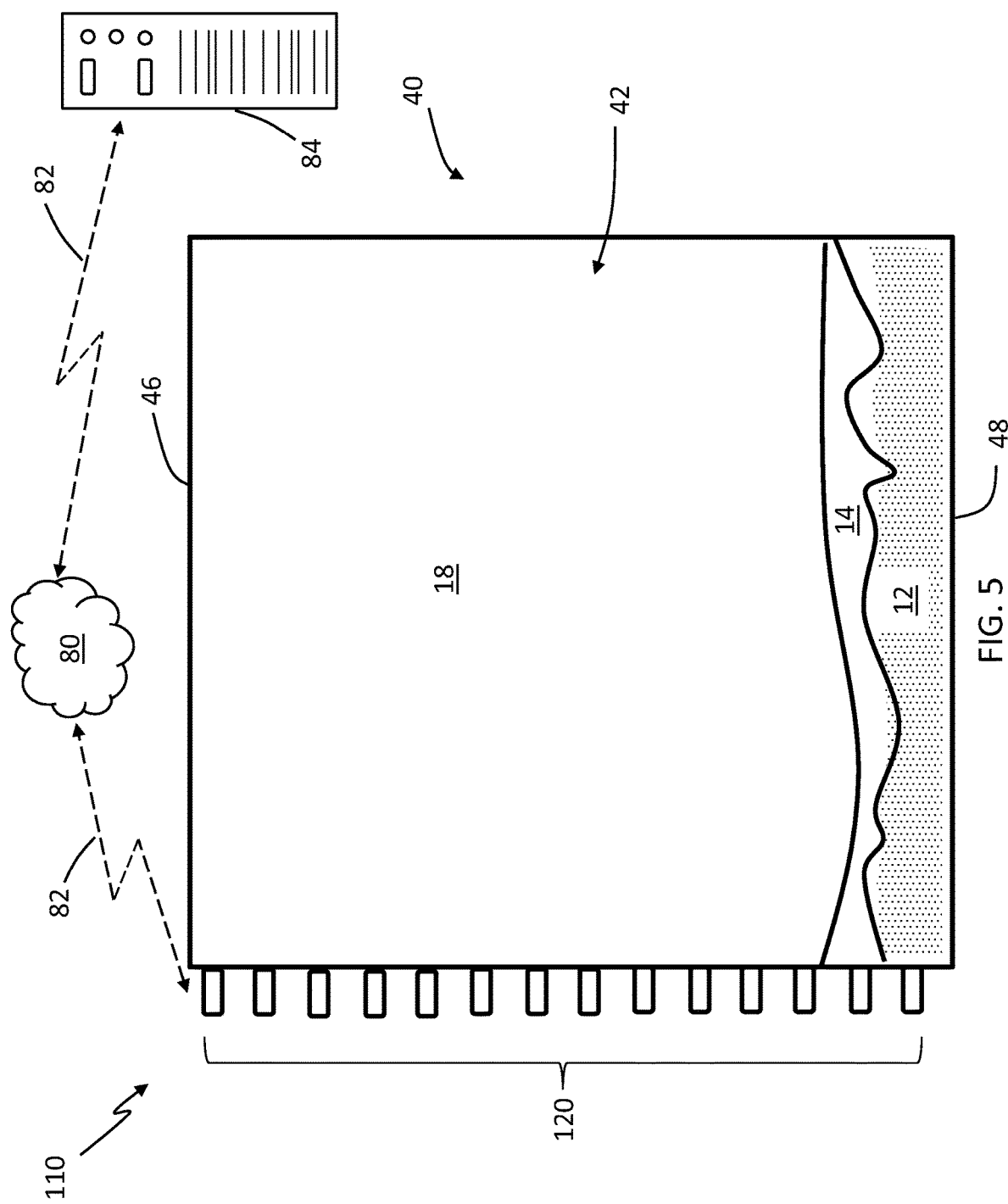
FIG. 5 is a diagrammatical cross-sectional illustration of the apparatus for multi-bounce acoustic signal material detection, in accordance with the second exemplary embodiment of the present disclosure.

FIG. 5 is a diagrammatical cross-sectional illustration of the apparatus for multi-bounce acoustic signal material detection, in accordance with the second exemplary embodiment of the present disclosure, and FIG. 5 depicts an example where the container 40 is near empty and a plurality of acoustic sensors 120 are used. In the case where more than two acoustic sensors 120 are used, communication between multiple sensors 120 is able to determine the position of the current level of any material in the container 40. In operation, the bouncing signal 150 (FIGS. 3-4) may only be transmitted between the sensors 120 to indicate change of density from the previous sensor 120. In this way, it may be possible have a line of sensors on the side of the container 40 spaced over certain distance that communicate between each other and determine where along the vertical height of the container 40 more accurate measurements are needed. Then, the two neighboring sensors 120 to that position on the container 40 may communicate with each other and start the process of evaluating the level with the requested accuracy. In this way, the use of more than two acoustic sensors 120 can quickly pinpoint the location of a material change within the container 40.

With reference to FIGS. 2-5, it is noted that the apparatus 110 may utilize data aggregation and processing, whereby the signal data from the acoustic sensors 120, 20A-20D, or any other acoustic or non-acoustic sensors, is transmitted to a computing system for analysis, detection, processing, alerting, or other functionality. For example, as shown in FIGS. 2 and 5, the apparatus 110 may be in communication with a cloud computing network 80 through one or more communication channels 82 and a server 84 with a processor which analyzes and aggregates the information. Any type of known computing infrastructure may be used, all of which are considered within the scope of the present disclosure. A processing platform may be used as a control system within the cloud network 80 or server 84. The processing platform may include or utilize artificial intelligence that manages the sensors 120, 20A-20D, similar to an IoT device, thereby allowing them to provide accurate material level assessment of the materials inside the container with little manual interaction.

With regards to acoustic sensor position and movement, it is further noted that the acoustic sensors 120 may have the capability of tangential movement, i.e., to move in a plane tangential to the exterior surface 44B of the container 40 at the location of the sensor 120.

Figure 6:
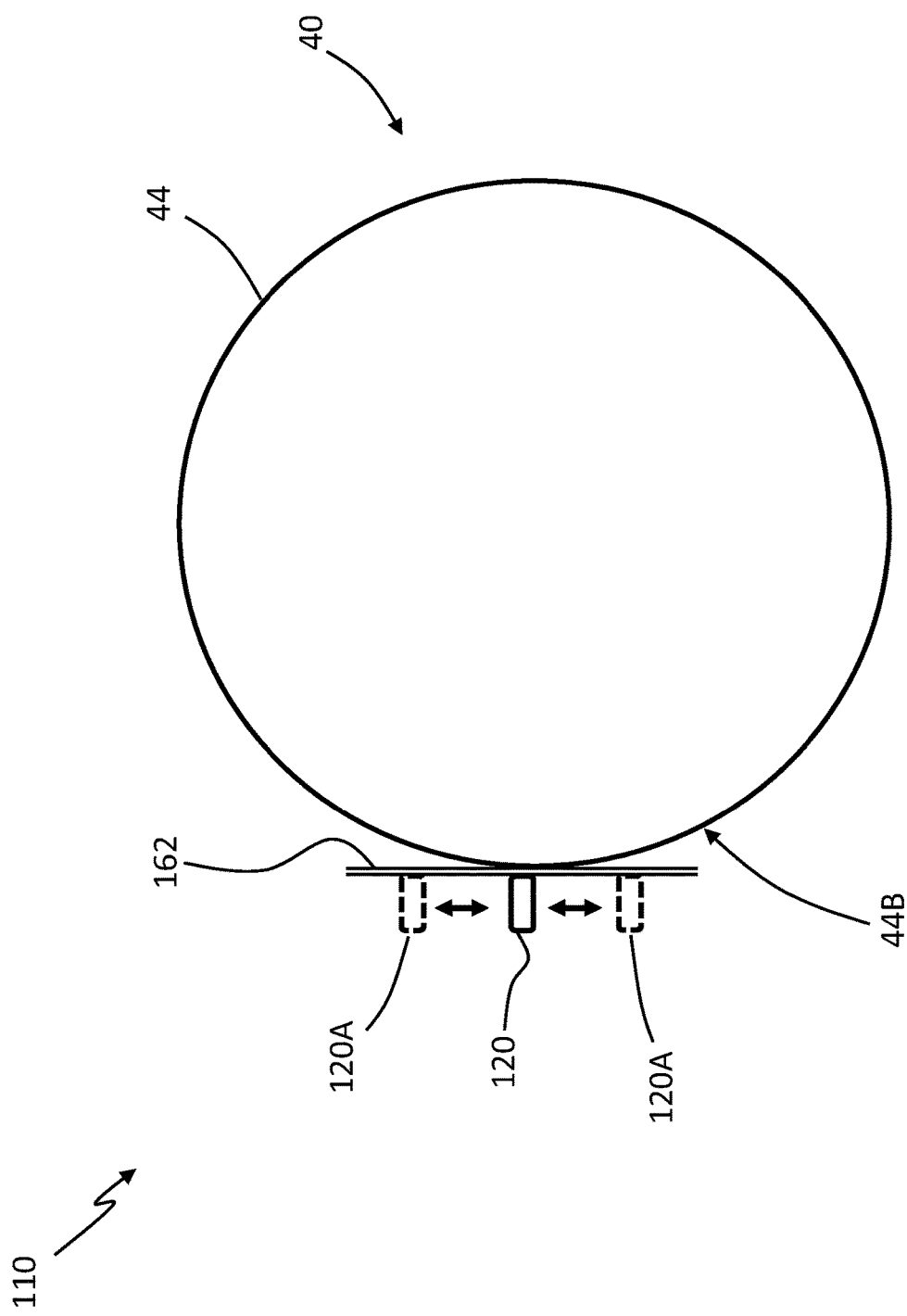
FIG. 6 is a diagrammatical top view illustration of the apparatus for multi-bounce acoustic signal material detection, in accordance with the second exemplary embodiment of the present disclosure.

FIG. 6 is a diagrammatical top view illustration of the apparatus for multi-bounce acoustic signal material detection, in accordance with the second exemplary embodiment of the present disclosure, where FIG. 6 illustrates the use of a tangential movement with the acoustic sensor 120. As shown in FIG. 6, the acoustic sensor 120 may be mounted to a mounting structure 162 which is positioned tangential to the exterior surface of the container 40 sidewall 44. The mounting structure 162 may be, for example, a durable frame with a substantially planar platform on which the acoustic sensor 120 may be mounted and moved laterally or vertically thereon, depending on the orientation of the mounting structure 162, to a new position as shown at 120A. Any type of mechanical or electro-mechanical components may be used to construct or operate the mounting structure 162.

The use of acoustic sensors 120 which have the capability of tangential movement can lead to an additional level of freedom to generate more accurate measurements, since it may provide heightened adjustment and tuning of the signal transmission, in addition to changing the angle and the wavelength, as previously discussed. This ability may extend the range and accuracy of the apparatus 110 and it may be used to optimize placement of the acoustic sensors 120 to account for dynamically changing levels of fluids in the container 40. In one particular example, this process may occur in a larger degree when the container 40 is being filled up after a maintenance and emptied before maintenance.

Processing of the signal or signals emitted from the acoustic sensor or sensors 20A-20D and 120 for detection of the material level within the container 40 may rely on a number of factors, computations, and assessments. First, computationally, it is possible to estimate the material properties of the sidewall 44 of the container 40 using the first echo of the transmitted signal 150 from the outside surface 44B of the sidewall 44 and measurement of temperature of the sidewall 44 at that location. Using a resonance method and the specification for the sidewall 44 of the container 40, e.g., which can be retrieved from data provided from the container manufacturer or deduced elsewhere, it is possible to determine or measure an accurate sidewall 44 thickness for this specific portion of the sidewall 44 at the location or anticipated location of the sensor 120. In one of many alternatives, it is possible to measure the entire sidewall 44 thickness independently.

During the setup of the apparatus 110, the number of bounces or signal 150 reflections may be counted using the angle of signal transmission and the determined thickness of the sidewall 44. Then, during measurement, the time-of-flight and attenuation are used to evaluate how many bounces were in the material below an impedance barrier between distinct layers of the material, and then, how many bounces are in the material above the impedance barrier. For example, relative to FIG. 3, the number of bounces of the signal 150 in the sidewall 44 proximate to the water 14 below the water surface 14A, e.g., $B_1$ through $B_4$, may be evaluated, and then the number of bounces in the crude oil 16 above the water surface 14A, e.g., $B_5$ through $B_9$, may be evaluated. Using the measured densities for both materials, e.g., the water 14 and the crude oil 16, it is possible to estimate how much energy is lost at each bounce on inside surface 44A of the sidewall 44. Assuming the medium outside of the container 40, e.g., along the exterior surface 44B, is atmospheric air or a similar material with known properties, it is possible to add these losses of energy in the signal. These cumulative signal energy losses may then be compensated or corrected for the ambient temperature of air, as well as pressure and humidity, among other possible parameters.

With these measurements, determinations, and/or calculations, it is possible to know the distance the signal 150 travels and the energy loss at each bounce for both or all materials in the container 40, and the attenuation in the material of the sidewall 44. Then, the temperature compensated attenuation for each measurement is subtracted, and the resulting numeric represents the energy lost at the signal 150 reflections. To find the level of the material within the container 40, the following equations can be used:

$$A*x+B*y+C*z=M$$

Where:
  A is the amount of the signal that is lost at each reflection from material below the impedance barrier;
  B is the amount of the signal that is lost at each reflection from material above the impedance barrier;
  C is the amount of the signal that is lost at each reflection from the air at the outside surface of the sidewall of the container;
  M is the measured energy of the signal at the receiving sensor;
  z is the number of bounces at air boundary along the outside surface of the container sidewall;
  y is the number of bounces at the inside boundary of the material above the impedance barrier; and
  x is the number of bounces at the inside boundary of the material below the impedance barrier.

Additionally:
  z=N−1, where N is the total number of bounces; and
  x+y=N where N is the total number of bounces.

Therefore, to solve the above equation, one can use the following equation:

$$A*x+B*(N-x)+C*(N-1)=M$$

or $$x=(M-B*N-C*(N-1))/(A-B)$$

The accuracy of this measurement is controlled by the step of the signal bounce. In one example, shear waves at 45° is initially used. Then, shear waves at 35° and 33° degrees may be used to progressively increase the amount of energy of the signal without requiring an increase of signal level from the acoustic sensor. To increase the accuracy, longitudinal waves up to 20° can be used. Similar to the shear waves at 10° or 5°, the energy of the wave sent into the sidewall will be higher without increasing the power of the signal from the acoustic sensor. At this point, the length of the signal path is increasing substantially, and this will require more power at the acoustic sensor adjusted for the increased power and angle of the acoustic wave, as well as the type of the acoustic wave used. It is noted that types of waves that may be sent from the acoustic sensor on the sidewall can be shear and or longitudinal waves, since the incidence angles can be set to match the requirements of the apparatus.

Since the level of the sediment, water, or other materials can change with the amount of fluid stored in the container, the location of the acoustic sensor may need to be adjusted periodically. It may be possible to use multiple sensors that transmit the signal, so long as at least one sensor receives the signal. For example, the acoustic sensor receiving the signal can be configured as a single sensor or multiple sensors, sensor array or movable sensor. Any extra sensors may be used as a synchronization device. If an acoustic sensor is movable on the receiving side of the signal, it can be moved in a plane tangential to the surface of the container, which is common for cylindrical tanks or pipelines. Other types of containers may require only planar movement on one side of the container. The movement can catch signals that reflect geometrically outside of the acoustic sensor location in the case of changing temperature or fluid composition of the material inside the container or the pipeline. The sending acoustic sensor may have the capability to rotate and move in a plane tangential to the surface of the container. This way the surface of the fluid can be characterized using the reflections and changing of the signal path. The number of acoustic sensors on the signal receiving side can be determined from the condition of the material(s) inside the container and the capabilities of each individual acoustic sensor.

Additionally, for containers with fluid moving therethrough, such as pipelines or storage tanks with inflow and outflow, when the fluid is flowing through the container, the signal sensing sensors can be added in two dimensions along the direction of the flow and in a perpendicular direction of the flow to determine the flow and the additional parameters of the fluid. The signals must be phase synchronized since their amplitudes are combined in the receiving acoustic sensor before processing of the signal. It is possible to use the wave physical properties to amplify the signal by superimposing multiple waves over time. Attenuation is one of the most affected parameters in this measurement approach since this parameter is most sensitive to the material parameters and impedance barriers. Acoustic wave absorption is compensated for temperature and is measured at different frequencies. Different frequencies can be used in certain cases, where the material acoustic attenuation allows for receiving of different signals with each individual signal using separate frequency. This way, the signals may not need to be synchronized and it is possible to measure multiple points of the absorption vs. frequency curve at the same time periodically. Time of flight measurements may need further processing since each path has different time of flight. In the case when each signal path may use different frequencies the time of flight may be measured separately.

Figure 7:
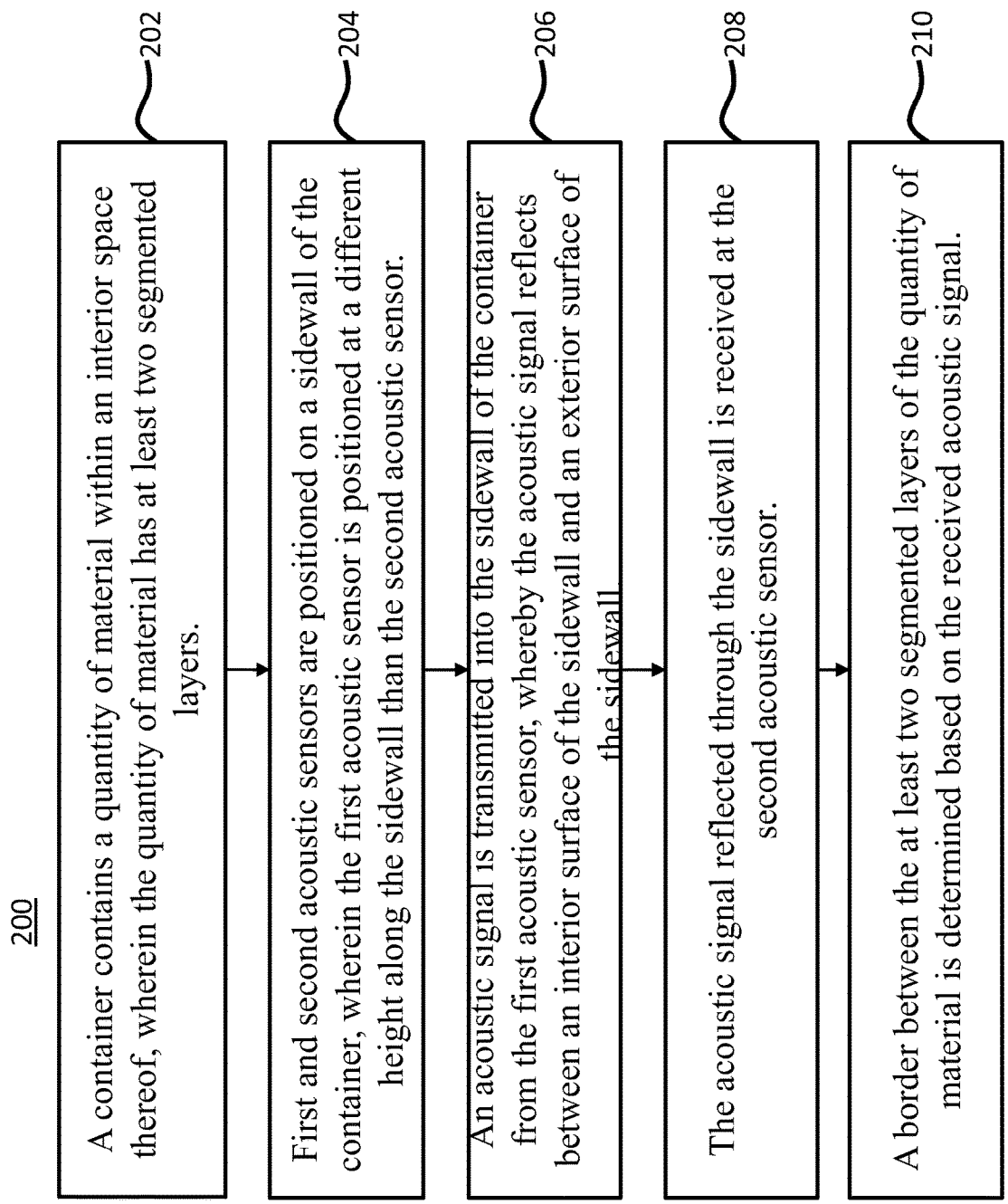
FIG. 7 is a flowchart illustrating a method for multi-bounce acoustic signal material detection, in accordance with the second exemplary embodiment of the present disclosure.

FIG. 7 is a flowchart 200 illustrating a method for multi-bounce acoustic signal material detection, in accordance with the second exemplary embodiment of the present disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 202, a container contains a quantity of material within an interior space thereof, wherein the quantity of material has at least two segmented layers. First and second acoustic sensors are positioned on a sidewall of the container, wherein the first acoustic sensor is positioned at a different height along the sidewall than the second acoustic sensor (block 204). An acoustic signal is transmitted into the sidewall of the container from the first acoustic sensor, whereby the acoustic signal reflects between an interior surface of the sidewall and an exterior surface of the sidewall (block 206). The acoustic signal reflected through the sidewall is received at the second acoustic sensor (block 208). A border between the at least two segmented layers of the quantity of material is determined based on the received acoustic signal (block 210). The method may further include any number of additional steps, processes, or functions, including any discussed or disclosed relative to any other figure of this disclosure.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claim.

What is claimed is:

1. A system for multi-bounce acoustic signal material detection, the system comprising:
   a container containing a quantity of material within an interior space thereof, wherein the quantity of material has at least two segmented layers;
   first and second acoustic sensors positioned on a sidewall of the container, wherein the first acoustic sensor is positioned at a different height along the sidewall than the second acoustic sensor, wherein, an acoustic signal is transmitted into the sidewall of the container from the first acoustic sensor, wherein the acoustic signal reflects between an interior surface of the sidewall and an exterior surface of the sidewall until it is received at the second acoustic sensor, and wherein a border between the at least two segmented layers of the quantity of material is detectable based on the acoustic signal, wherein the border between the at least two segmented layers of the quantity of material is detectable based on a counted number of reflections of the acoustic signal between the interior surface of the sidewall and an exterior surface of the sidewall above and below an impedance barrier formed at the border between the at least two segmented layers of the quantity of material, and wherein a height position of at least one of the first and second acoustic sensors is adjustable; and
   at least one computing device in communication with the first and second acoustic sensors, wherein a material identity of one or more of the at least two segmented layers is determined by the at least one computing device.

2. The system of claim 1, further comprising at least one computing device in communication with the first and second acoustic sensors, wherein a time-of-flight measurement of the acoustic signal is determined by the at least one computing device.

3. The system of claim 1, wherein at least one of the first and second acoustic sensors determines a thickness of the sidewall of the container.

4. The system of claim 1, wherein one or both of the first and second acoustic sensors is positioned angularly to the sidewall of the container, wherein the signal transmitted from the first acoustic sensor is transmitted at a non-perpendicular angle into the sidewall.

5. The system of claim 1, wherein one or both of the first and second acoustic sensors are adjustable along a tangential plane of the sidewall of the container.

6. The system of claim 1, wherein the second acoustic sensor controls a phase shift of the acoustic signal transmitted from the first acoustic sensor.

7. A system for multi-bounce acoustic signal material detection, the system comprising:
   a container containing a quantity of material within an interior space thereof, wherein the quantity of material has at least two segmented layers;
   first and second acoustic sensors positioned on a sidewall of the container, wherein the first acoustic sensor is positioned at a different height along the sidewall than the second acoustic sensor, wherein an acoustic signal is transmitted into the sidewall of the container from the first acoustic sensor, wherein the acoustic signal reflects between an interior surface of the sidewall and an exterior surface of the sidewall until it is received at the second acoustic sensor; and
   at least one computing device in communication with the first and second acoustic sensors, wherein a border between the at least two segmented layers of the quantity of material is detectable based on the acoustic signal, wherein the border between the at least two segmented layers of the quantity of material is detectable based on a counted number of reflections of the acoustic signal between the interior surface of the sidewall and an exterior surface of the sidewall above and below the border between the at least two segmented layers of the quantity of material;
   wherein at least one of the first and second acoustic sensors determines a thickness of the sidewall of the container.

8. A method for multi-bounce acoustic signal material detection, the method comprising:
   providing a container containing a quantity of material within an interior space thereof, wherein the quantity of material has at least two segmented layers;
   positioning first and second acoustic sensors on a sidewall of the container, wherein the first acoustic sensor is positioned at a different height along the sidewall than the second acoustic sensor;
   transmitting an acoustic signal into the sidewall of the container from the first acoustic sensor, whereby the acoustic signal reflects between an interior surface of the sidewall and an exterior surface of the sidewall;
   receiving the acoustic signal reflected through the sidewall at the second acoustic sensor; and
   determining a border between the at least two segmented layers of the quantity of material based on a counted number of reflections of the acoustic signal between the interior surface of the sidewall and an exterior surface of the sidewall above and below an impedance barrier formed at the border between the at least two segmented layers of the quantity of material.

9. The method of claim 8, further comprising determining a material identity of one or more of the at least two segmented layers.

10. The method of claim 8, further comprising adjusting a height position of at least one of the first and second acoustic sensors.

11. The method of claim 8, further comprising at least one computing device in communication with the first and second acoustic sensors, further comprising determining a time-of-flight measurement of the acoustic signal by the at least one computing device.

12. The method of claim 8, further comprising controlling, by the second acoustic sensor, a phase shift of the acoustic signal transmitted from the first acoustic sensor.

13. The method of claim 8, further comprising determining a thickness of the sidewall of the container with at least one of the first and second acoustic sensors.

14. The method of claim 8, further comprising positioning one or both of the first and second acoustic sensors angularly to the sidewall of the container, whereby the signal transmitted from the first acoustic sensor is transmitted at a non-perpendicular angle into the sidewall.

15. The method of claim 8, further comprising adjusting one or both of the first and second acoustic sensors along a tangential plane of the sidewall of the container.

16. The method of claim 8, wherein determining the border between the at least two segmented layers of the quantity of material based on the received acoustic signal further comprises calculating an energy loss of the acoustic signal from a number of reflections of the acoustic signal between the interior surface of the sidewall and an exterior surface of the sidewall above and below the border between the at least two segmented layers of the quantity of material.

* * * * *